June 2, 1953  T. T. AREL  2,640,220

TRAP-NEST GATE

Filed Feb. 6, 1951  5 Sheets-Sheet 1

INVENTOR.
Theophile T. Arel
BY Robt S. Woolsey

June 2, 1953 T. T. AREL 2,640,220
TRAP-NEST GATE
Filed Feb. 6, 1951 5 Sheets-Sheet 2

INVENTOR.
Theophile T. Arel
BY

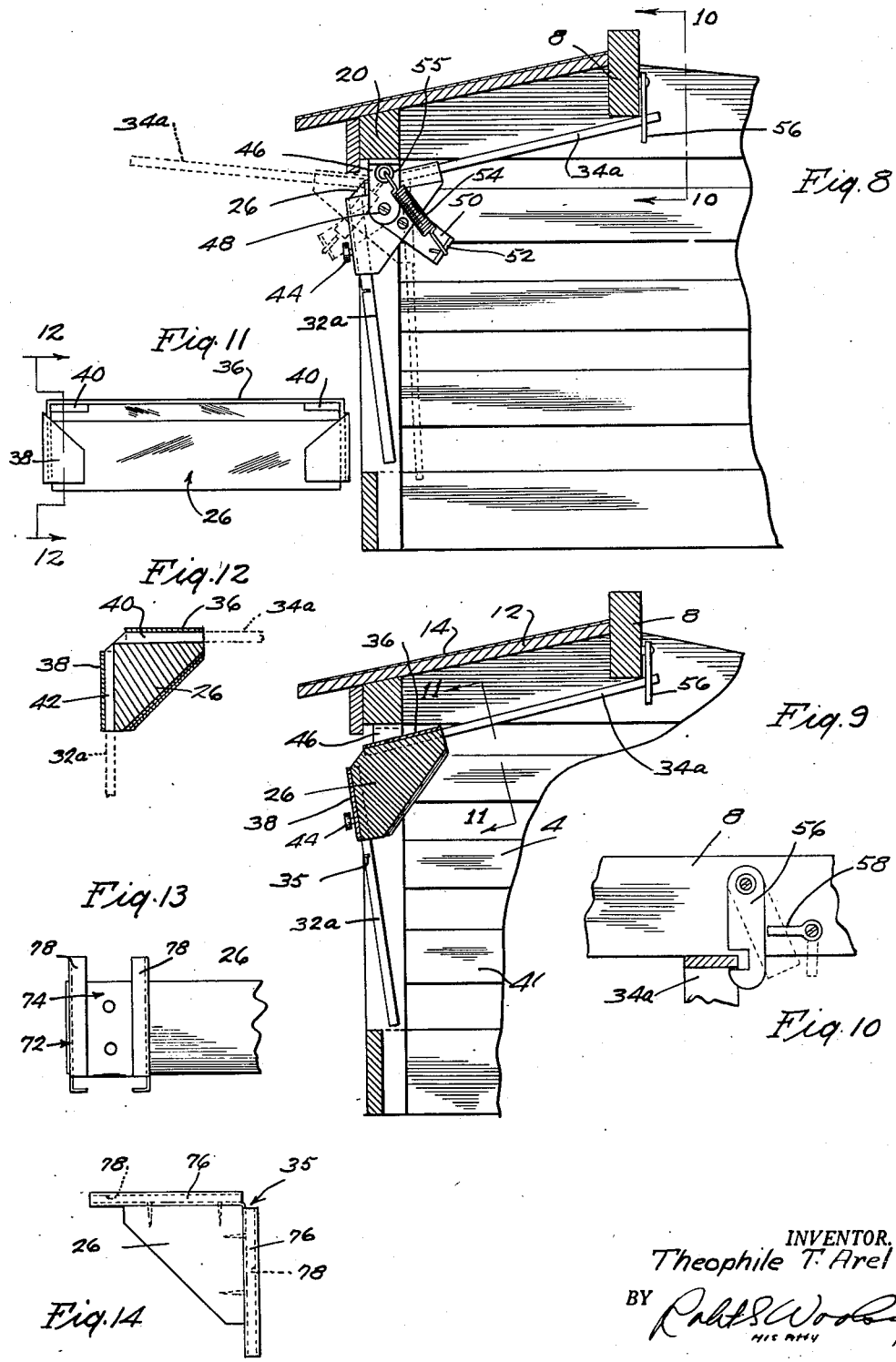

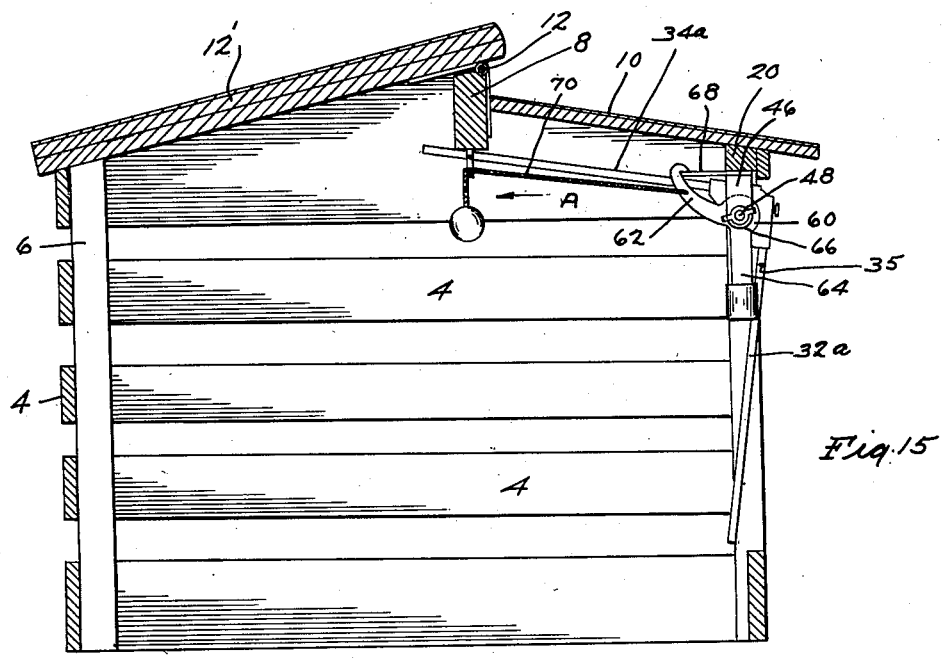

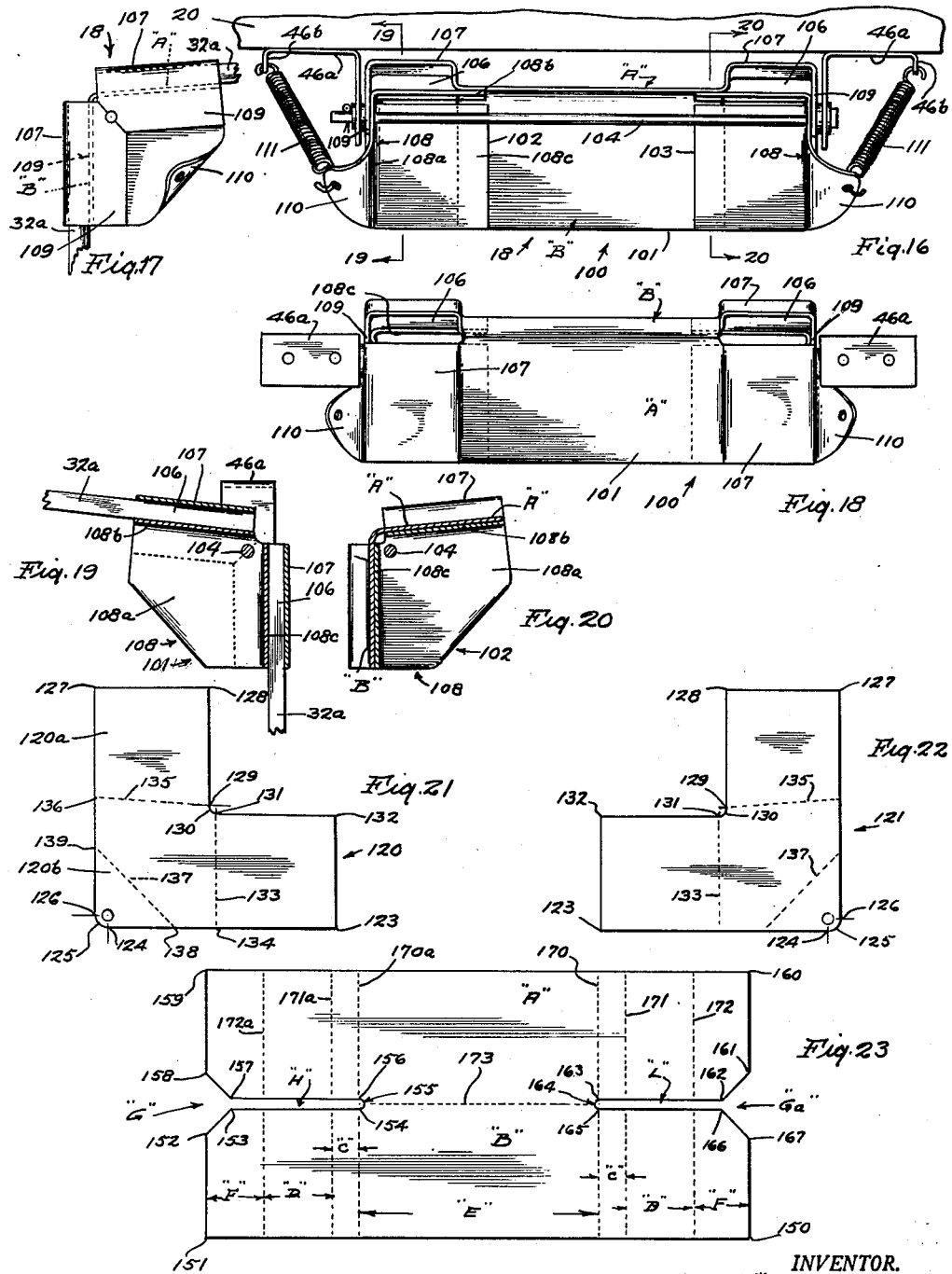

Patented June 2, 1953

2,640,220

UNITED STATES PATENT OFFICE 2,640,220

TRAP-NEST GATE

Theophile T. Arel, Murietta, Calif.

Application February 6, 1951, Serial No. 209,644

4 Claims. (Cl. 16—167)

The present invention relates to an improved trap-nest for poultry and is particularly designed to meet conditions attendant to production of high quality turkey eggs for subsequent hatching.

During the clutching period it is desirable in the interest of good management to keep a careful record of the egg production of each turkey hen, to be able to ascertain the condition of the eggs layed by each hen of the flock, that is, to ascertain whether the eggs produced are of such size, shape, weight and general condition as to produce a healthy and vigorous poult; to protect a turkey hen from molestation by other turkeys when laying; to provide a trap-nest gate so constructed and arranged as not to interfere with or engage the protective saddle worn by a hen; to provide a new and simplified gate for a trap-nest; to provide a trap-nest gate so constructed and arranged as to be predeterminedly operable to entrap and retain a hen in the nest pending inspection of her egg for hatching qualities; to provide a trap-nest gate adapted to be operable to admit and permit the exit of a hen to and from a nest by self-applied pressure at all times other than when inspection of egg production is desired; to provide a trap-nest gate so constructed as to have an element thereof yield and/or break as a safety device for protection of a turkey hen in those instances in which a hen becomes caught in the trap and might otherwise harm or even kill herself in thrashing about. To provide a gate for a trap-nest so constructed and arranged as to enable an attendant to easily and quickly replace gate pickets if any thereof should be accidentally broken; to provide a trap-nest and gate therefor which is readily accessible for cleaning and spraying; to provide a trap-nest and gate so constructed and arranged as to be adapted to use in batteries thereof to facilitate attendance and care thereof; and, to provide a trap-nest and gate construction adapted to mass production and low cost thereof.

The foregoing and others objects, features and advantages of the improvement are to be noted in a study of the accompanying drawing; the detailed specification and the sub-joined claims.

In the drawing, of which there are four sheets:

Figure 1 is a front elevational view showing a battery of three of the trap-nests and gates of this improvement; and, Figure 2 is a top-plan view thereof; while.

Figure 5 is a similar view except that here the cover-lid is shown in raised position to provide access to the interior of the trap-nest; while.

Figure 8 is a sectional view taken along line 8—8, Figure 7, showing the gate mounted and in side elevation, the view also shows one form of locking means to retain a nesting hen turkey.

Figure 9 is also a sectional view, being that seen along line 9—9, Figure 7, the view shows the manner in which the gate pickets are slidably fitted in the pivot body element thereof.

Figure 10 is an enlarged elevational view along line 10—10, Figure 8, showing the gate retaining latch thereof.

Figure 11 is an elevational view of the pivot body of the gate, the view is taken along line 11—11, Figure 9; and, Figure 12 is an end view thereof, see line 12—12, Figure 11.

Figures 13 and 14 are plan and side elevational views of a modified form of picket support adapted to be mounted upon the body of the gate.

Figure 15 is a sectional view taken transversely of the nest showing a modified form of manual release latch to secure the gate in closed position to retain a hen therein.

Figure 16 is a front elevational view showing my improved gate support structure formed of die stamped component parts which are welded together to form a unitary structure adapted to receive wood slat closure pieces, means for hinged mounting thereof on a nest framing structure and means for attaching springs thereto whereby the gate in passing over a dead-center is held in either open or closed position across the entrance to a nest.

Figure 17 is an end view thereof; and,

Figure 18 is a top-plan view of the gate support.

Figure 19 is a sectional view taken along line 19—19, Figure 16, showing the gate support construction; and, Figure 20 is a similiar view taken along line 20—20, figure 16, for the purpose of showing construction of the support.

Figure 21 is a top-plan view of a blank for the left-hand side of the support, this element of the construction forms the closure therefor when folded along the dotted lines; and, Figure 22 is a companion blank adapted to form the right-hand closure for the gate support when folded along the dotted lines.

Figure 23 is a top-plan view of the central piece of the construction and after having been folded along the several dotted lines as hereinafter described is adapted to receive the end closure pieces spot welded thereto to form a unitary structure.

In the present embodiment of the improvement I show three of the trap-nests 2 in a unitary structure or battery thereof, although it will be apparent to all concerned that the trap-nest may be made as a single unit or as a battery of more than three thereof.

Figure 1:
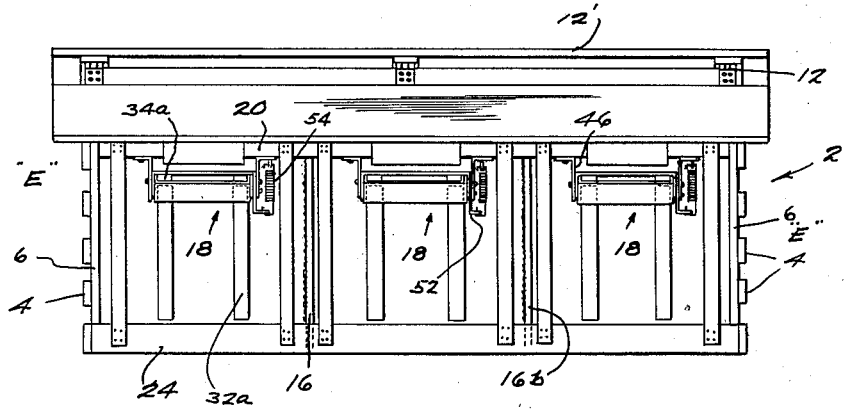
Figure 2:
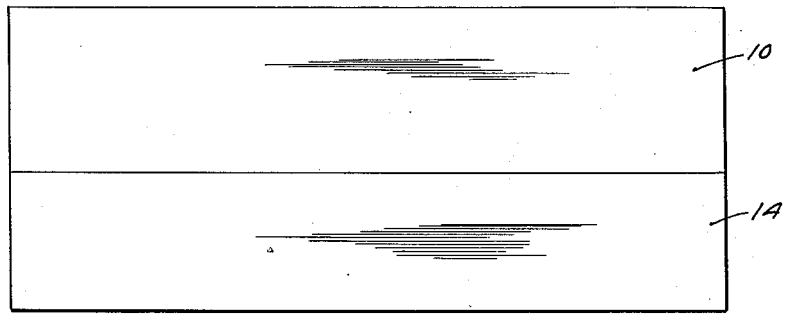
Figure 3:
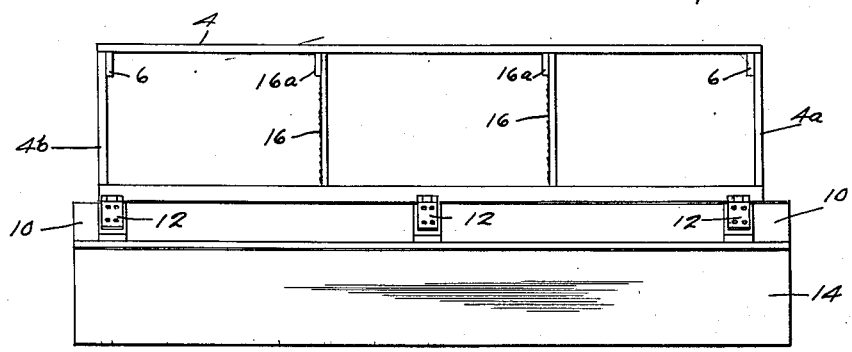
Figure 3 is a top-plan view of the battery with a cover-lid raised to show the interior thereof.
Figure 4:
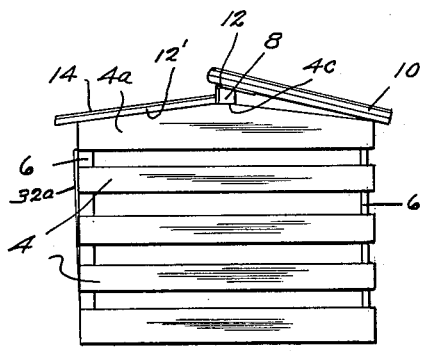
Figure 4 is an end view in elevation.
Figure 5:
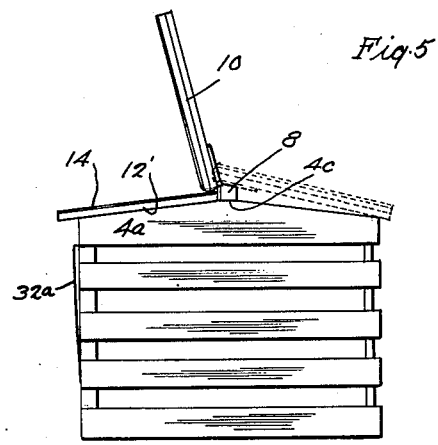
Figure 6:
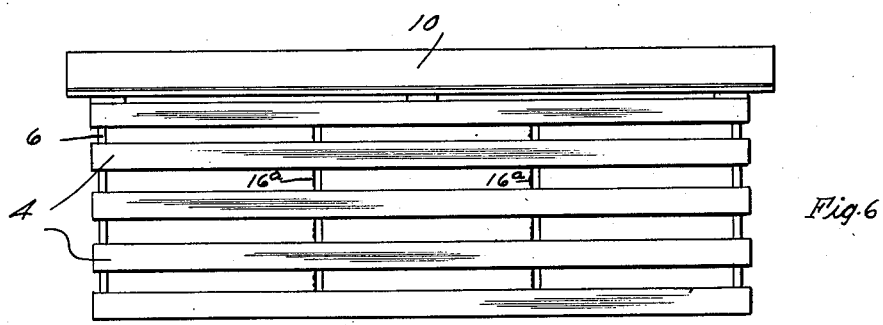
Figure 6 is a rear-elevational view of the trap-nest.
Figure 7:
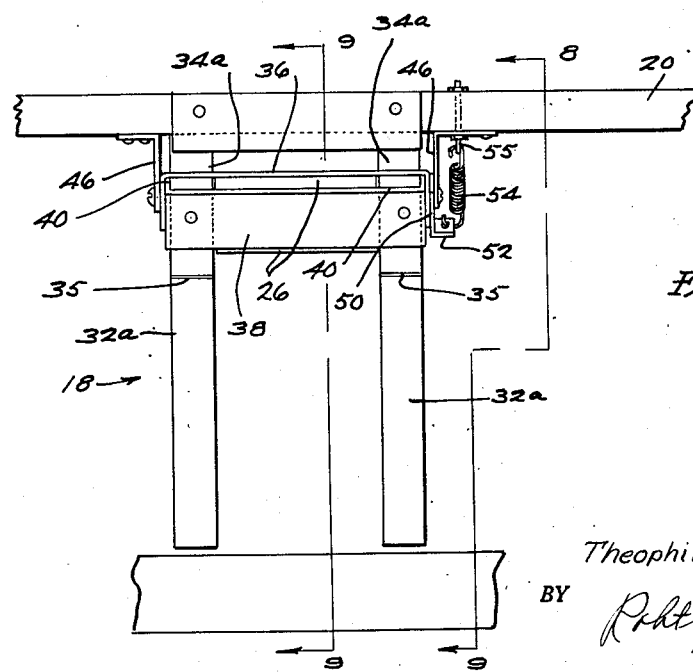
Figure 7 is an enlarged elevational view of one of the gates for the trap-nest, the view shows the improved gate construction including means to facilitate replacement of broken pickets and the scoring of the pickets to facilitate breakage thereof in case of need thereof to release a hen caught in the gate.

The frame of a single trap-nest or of a multiple number thereof comprises spaced, horizontally disposed wood pieces 4 which extend along each of the sides and along the rear of the nest, and are secured to vertical pieces 6 so as to form a structure having three slatted sides as distinguished from the front upon which side the gates are positioned. The side pieces 4a and 4b are apexed to provide a crown support 4c upon which a horizontal rail 8 is positioned and which rail is adapted to provide a support for a cover-lid 10 hingedly secured at 12 thereto so that approximately one half of the roof structure may be raised from a normally inclined position as shown in Figure 4 to a raised position as shown in Figure 5 thereby providing access to the interior of the trap-nest for recovery of and inspection of eggs, and also to enable an attendant to obtain physical control of the hen if need be. It is to be noted that the forward edge of the cover-lid 10 overhangs the rail 8 and is brought into abutment with the rail 8 when the cover-lid is raised and serves to hold the lid in backwardly inclined raised position so that both of the hands of an attendant are free for working within the nest if need be. The free edge of the cover-lid rests upon the uppermost of the rear horizontal pieces 4 and when in this position or closed position is provided with sufficient slope to cause rain to naturally drain therefrom. The forward half of the trap-nest is provided with a sloping, non-removable roof slab 12 which may be covered with a waterproof material 14 such as sheet metal or a roofing composition.

If there are more than one of the trap-nests, then each thereof is separated from the other by means of a woven wire barrier screen 16 tacked on or otherwise secured to the vertical pieces 16a along the rear of the structure and to like pieces 16b upon the inner side of the front of the structure.

A gate 18, of which there is one for each nest, is formed as a separate unit which is swingably mounted upon the front horizontal rail 20 and is positioned centrally of the sides of each of the nests. Vertical strips 22 may be nailed to the upper horizontal rail 20 and to a lower horizontal board 24 to partially cover the space 23 between the sides of the gate and the ends E, E' of the structure is formed as a single nest unit, or to cover the space between the gate and either one of these ends and a partitioning screen barrier 16, or between a gate and screen barriers 16 upon both sides thereof, as the case may be.

The gate 18 shown herein comprises blocks of wood 26 having a length approximately equal to the width of the gate opening and are substantially although not fully triangular in section so as to provide faces 28 and 30, these faces, as inferred, are slightly divergent with respect to one another, that is, with respect to the part 26 they lie in planes in excess of 90 degrees with respect to one another.

Each of the ends of the part 26 are formed with an off-set or step face 32 and 34 upon the sides 28 and 30 and which off-set faces are of a depth and width adapted to flush-fit receive the sectional dimensions of pickets 32a and 34a therein. A metal strip 36 lies upon the face 28 of the part 26 and horizontally across the off-set face 32 and is then bent at right angles to lie against and secured to the ends of the part 26, and in like manner a metal strip 38 lies upon the face 30 and horizontally across the off-set face 34 and is then bent at right angles to lie against and extend across the ends of the first mentioned strip and then be secured in like manner to the ends of the part 26. This construction forms rectangular, slip-fit pockets 40 and 42 for one end of each of the pickets 32a and 34a. Screws 44, inserted through suitable apertures in the metal strips 36 and 38 and the pickets, are screw threaded in the part 26 to provide a facile operated means to easily and quickly replace the pickets if broken; and in this connection it is to be noted that each of the pickets are formed with a transverse cut upon their exterior face which cut is adapted to weaken the picket in sufficient degree to cause it to break under thrashing impact of a hen turkey if for any reason the hen becomes caught in or upon any of the appertenances of the trap-nest. Normally the slotted pickets possess sufficient strength to meet all imposed requirements thereof.

Brackets 46 attached to the horizontal rail 20 of the nest structure are adapted to swingably support the part 26 upon screw threaded pintles 48. A finger 50 having an outturned end 52 is placed between one of the brackets 46 and the adjacent sheathed end of the part 26 and is adapted to hold one end of an extensile spring 54 the opposite end of which is anchored upon a screw attached to the beam 20 afore-mentioned. The spring is adapted to yieldably hold the gate in either of its functional positions against free swinging movement.

As previously mentioned there are occasions, such as at the beginning of the clutching season, when it is desirable to entrap a hen to inspect her eggs, or for other reason, this I accomplish by provision of a self-operated latch 56 which is pivotally positioned upon the rail 8 and so located thereon as to be intercepted by a picket 34a and is momentarily pushed aside by the picket in moving to rest against the rail 8, but which thereafter swings back to engage and hold the picket in raised position. A keeper 58 may be applied to the latch to prevent its accidental release or to prevent operation of the latch if it is not desired to lock the gate against functional swinging movement.

In Figure 15 I show a modified form of latching structure for securing the gate against swinging movement, here a metal stamping 60 having a latch finger 62 and a weighted, pendent arm 64 is fulcrumed upon a pintle 48 and is adapted to be clamped in non-functional use position between one end of the part 26 and the adjacent bracket 46 by means of a wing-nut 66. A bar 68 secured to the beam 20 is adapted to be engaged by the lip of the latch finger for retention thereof. Loosening the nut 66 and pulling the weighted cord 70 in the direction of the arrow A holds the latch out of engagement with the bar 68, while release of the cord and tightening the nut enables the latch to swing with the gate so that each time the gate is swung inwardly the latch engages the bar 68 thereby holding the gate in locked position until manual disengagement of the latch from its retaining bar 68.

In Figures 13 and 14 I show another form of construction adapted to detachably support the pickets 34 in functional relationship to the gate body 26. This picket support is formed of sheet metal 72 bent to form a channel 74 having sides 76 and overhanging top-edges 78. This structure is then cut through the sides 76 and the top-edges 78 and is then bent through approximately 90 degrees, it is then placed upon the part 26 and secured in place thereon. Pickets may be slipped within the defined channels 74 and retained therein by means of a screw as aforementioned.

In Figures 16–23 I show another form of gate support 18 wherein in lieu of processed blocks 26 and the blocks associated with metal strips 36—38, this variation thereof is formed as a sheet metal manufacture 100 having a medial body portion 101 and end pieces 102 and 103. The body portion is bent medially and longitudinally of its length to form half-portions A and B which may be alternatively swung to and from vertical position by reason of being rotatably positioned upon a rod 104, which extends longitudinally through the part 100, in L brackets 46a which are adapted to be fixedly secured to an overhead rail 20 in the frame of the nest.

The body portion 101 is formed with channels 106 in the end portions thereof, the crowns 107 of which are pressed outwardly as shown in Figures 16 and 18. Paired right and left hand closure plates 108 having an end wall 108a and inwardly bent rectangular tabs 108b and 108c are adapted upon assembly with the part 101 to complete the basic features of the manufacture.

The end plates 108a are suitably secured as by welding or riveting to the dependent outer flange 109 of the part 101, and the tabs 108b and 108c are placed across the open side of the channel 106 with their outer edges also welded or riveted to intermediate plane surfaces of the part 101 as shown in Figures 16 and 20.

The plates 108a of part 108 have a portion of their free corners rolled laterally and rearwardly to form ears 110 which are apertured to receive one of the hooked ends of a spring 111 while the other end of these springs are attached to the dependent lip 46b of the brackets 46a.

The structure afore-described is adapted to be hingedly positioned with respect to the rail 20 and the channels 106 therein are adapted to receive staves 32a therein whereby upon being swung to either of its alternative positions one pair of staves will stand vertically across the opening to the nest structure and the other pair of staves will either extend forwardly of the nest structure or rearwardly therewithin, and it is to be noted that in either of these last mentioned positions one pair of the staves are upwardly inclined from the horizontal whereby clearance of a turkey's saddle is afforded so that all danger of becoming entangled with the gate is avoided.

The gate element 100 hereinbefore described is efficient, simple and reliable in use and so constructed that the staves used in conjunction therewith are easily and quickly replaced and these truths rest upon the premise that the article is formed of but three simple die stamped parts which are easily and quickly assembled. The blanks from which these parts are formed are shown in Figures 21, 22 and 23.

I will now describe these blanks in detail for it is essential to have an understanding thereof to practice the invention.

Blanks 120 and 121 are identical except that they constitute right and left hand parts, and it is from these blanks that I form the closure elements 108. A description of one of these will suffice the purpose of this description.

The blanks are substantially L-shaped in plan view and are defined as follows, beginning at point 123 the sides thereof extend in a horizontal line to point 124, thence through a relatively small or tight 90 degree curve 125 to point 126, thence upwardly to point 27, thence horizontally to point 28, thence inwardly at right angle to point 129, thence through a relatively tight 90 degree curve 130 to point 131, thence horizontally to point 132, thence downwardly at right angle to point 123 which point is the point of beginning.

These blanks are further defined by bending points as follows:

Bending point 133 begins at point 131 and extends parallel with the line 123—132 to intersection at point 134 with the edge 123—124.

Bending point 135 begins at point 129 and extends to point 136 on line 126—127 and with respect to this line it is to be noted that line 135 does not lie in parallelism with either line 123—124 or line 127—128 but that it is slightly inclined from point 129 whereby upon being folded, part 120a of these blanks are caused to lie at an angle equal and proportionate to the angle lying between the half-portions A and B of the part 101 when folded as afore-described.

The ears 110 are formed upon bending the corner portion 120b of the blank along the bending line 137 which line is disposed at an angle of 45 degrees and intersects line 123—124 and line 126—127 at points 138 and 134 respectively. The corner segment thus defined is of such proportion as to provide ears 110 which extend laterally from the ends of the support a sufficient distance to give clearance to the spring 111 when placed in functional use position in the completed assembly.

The body portion 101 is formed from the blank shown in Figure 23, and its shape may be defined as extending in a horizontal line from point 150 to point 151, thence in a right angle to point 152, thence in a 45 degree angle to point 153, thence in a horizontal line to point 154, thence in a minor reverse curve 155 to point 156, thence in a horizontal line to point 157, the area between points 153 and 157 defines an elongated slot H, thence in a 45 degree angle to point 158, thence in a line parallel with line 151—152 to point 159, thence through a 90 degree angle and in a horizontal line to point 160, thence through 90 degrees to point 161, thence through 45 degrees to point 162, thence in an inwardly directed horizontal line to point 163, thence through a minor reverse curve 164 to point 165, thence in an outwardly directed horizontal line to point 166, the area between points 162 and 166 defines an elongated slot L, thence through 45 degrees to point 167 and thence in a straight line to point 150, which point is the point of beginning.

This blank is further defined by bending points as follows:

Bending points 170 and 170a extend transversely across the blank through the radius points of the curves 155—164, and bending points 171 and 171a extend across the blank in parallelism with lines 170—170a and are spaced therefrom a working distance equal to the depth of the channels 106. Bending points 172 and 172a lie parallel with lines 171—171a and are spaced therefrom a working distance equal to the width of the channels 106. Bending point 173 extends medially and longitudinally of the length of the blank to form the point around which the halfportions A and B are swung to form the transverse configuration of the gate as shown in Figure 20. In practice the blanks are die bent simultaneously along the several enumerated lines whereby the material E is not deformed, the material C is bent vertically upward to form the inner sides of the channel 106, the material D forming the crown of the channels remains parallel with the material E and the material F is bent downward through 90 degrees to form a flange 109 to the inner face of which the part 108a of the closures 108 are fixedly secured. The V slots G and Ga are provided to give clearance for flush mating of the flanges 109 as shown in Figure 17.

The blanks 21 and 22 are bent in a die along the several lines aforedescribed and located to form the parts 108a, 108b and 108c of the closures as shown in Figures 16 and 20.

Of the several forms of gate support structure herein shown and described in Figures 1 through 23, I prefer that shown in Figures 16 through 23 for the prime reason that it is more durable than the wood supports, also, it is more easily kept clean and free of ticks, lice, and other insects which are wont to breed upon or in the presence of fowl of the character aforementioned.

Having thus described my invention in its several forms including the presently preferred thereof, that which I believe to be novel and for which I seek Letters Patent, is as follows.

I claim:

1. A support for gate slats arranged to form closure pieces across an opening to a trap-nest, said support having an elongated body essentially formed of a single piece of L-shaped sheet metal having a slit extending inwardly of the ends thereof coincidental with the intersection of the sides of said body so as to form bifurcated end portions therefor, said bifurcated end portions being deformed to provide outwardly disposed slat-ways extending transversely thereacross, a capping on one side of each slat-way, said cappings on their one side being provided with outwardly inclined legs, and a pintle for said support, said pintle being positioned within said body adjacent the intersection of the sides thereof and extending through the ends thereof including said cappings.

2. The structure defined in claim 1 wherein the deformed bifurcated ends of the body of the support converge upon and intersect one another.

3. The structure defined in claim 1, wherein said cappings each have an element disposed to lie across a slat-way and another element disposed to form a side piece for said body.

4. The structure defined in claim 1, wherein each of said cappings have an element disposed to lie across each of the slat-ways in each end of said body and, another element disposed to form a side-closure for said body, said last mentioned element having a deformed corner portion arranged to provide a lug for connection with a spring.

THEOPHILE T. AREL.

References Cited in the file of this patent

UNITED STATES PATENTS

| Number | Name | Date |
|---|---|---|
| 864,598 | Baynes | Aug. 27, 1907 |
| 1,867,816 | Finkbeiner | July 19, 1932 |
| 2,105,879 | Hart | Jan. 18, 1938 |
| 2,113,859 | Rowe | Apr. 12, 1938 |
| 2,339,555 | Glass | Jan. 18, 1944 |
| 2,357,339 | Mathieu | Sept. 5, 1944 |